US 12,337,789 B1

(12) United States Patent
Satake (10) Patent No.: US 12,337,789 B1
(45) Date of Patent: Jun. 24, 2025

(54) SUPPORT MECHANISM FOR CURTAIN SHIELD AIRBAG

(71) Applicant: TOYOTA JIDOSHA KABUSHIKI KAISHA, Toyota (JP)

(72) Inventor: Atsushi Satake, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/909,789

(22) Filed: Oct. 8, 2024

(30) Foreign Application Priority Data

Dec. 15, 2023 (JP) ................................ 2023-211872

(51) Int. Cl.
*B60R 21/232* (2011.01)
*B60R 13/02* (2006.01)
*B60R 21/213* (2011.01)
*B60R 21/2165* (2011.01)

(52) U.S. Cl.
CPC .......... *B60R 21/232* (2013.01); *B60R 13/025* (2013.01); *B60R 21/213* (2013.01); *B60R 21/2165* (2013.01)

(58) Field of Classification Search
CPC ............. B60R 21/213; B60R 21/2165; B60R 21/232; B60R 2021/161; B60R 13/025
See application file for complete search history.

(56) References Cited

U.S. PATENT DOCUMENTS

| | | | | |
|---|---|---|---|---|
| 6,254,123 B1 * | 7/2001 | Urushi | .................. | B60R 21/213 280/730.2 |
| 6,305,707 B1 * | 10/2001 | Ishiyama | .............. | B60R 21/213 280/730.2 |
| 6,364,349 B1 * | 4/2002 | Kutchey | ............... | B60R 21/213 280/730.2 |
| 6,371,512 B1 * | 4/2002 | Asano | .................. | B60R 21/237 280/730.2 |
| 6,530,594 B1 * | 3/2003 | Nakajima | ............. | B60R 21/213 280/730.2 |
| 6,565,116 B1 * | 5/2003 | Tajima | .................. | F16B 21/075 24/297 |
| 6,664,470 B2 * | 12/2003 | Nagamoto | ............ | B60R 21/213 174/652 |
| 6,719,321 B2 * | 4/2004 | Yasuhara | .............. | B60R 21/213 280/730.2 |

(Continued)

FOREIGN PATENT DOCUMENTS

JP 10138858 A * 5/1998
JP 2001114054 A * 4/2001 ......... B60R 13/0206
(Continued)

*Primary Examiner* — Laura Freedman
(74) *Attorney, Agent, or Firm* — SoraIP, Inc.

(57) ABSTRACT

The curtain shield airbag is disposed in a storage space between a roof side panel and a roof lining. The support mechanism of the curtain shield airbag includes a case and a B pillar garnish. The case supports the curtain shield airbag. The top end of the B pillar garnish connects to the roof lining. A support surface of the curtain shield airbag is formed inside the case in the vehicle width direction. The case extends in an up-down direction. A flange is formed on a lower portion of the case. The flange is connected to the B pillar garnish. A thin portion, which is a fragile portion, is provided below the connection point with the flange of the B pillar garnish.

5 Claims, 5 Drawing Sheets

(56) References Cited

U.S. PATENT DOCUMENTS

| | | | | |
|---|---|---|---|---|
| 7,172,211 | B2 * | 2/2007 | Hirose | B60R 21/213 |
| | | | | 280/730.2 |
| 7,175,196 | B2 * | 2/2007 | Boxey | B60R 21/232 |
| | | | | 280/730.2 |
| 7,445,233 | B2 * | 11/2008 | McKimson | B60R 21/213 |
| | | | | 280/730.2 |
| 7,673,897 | B2 * | 3/2010 | Ochiai | B60R 21/232 |
| | | | | 280/730.2 |
| 7,766,378 | B2 * | 8/2010 | Miura | B60R 21/232 |
| | | | | 280/730.2 |
| 7,934,748 | B2 * | 5/2011 | Torii | B60R 13/025 |
| | | | | 280/730.2 |
| 8,876,152 | B1 * | 11/2014 | Zucal | B60R 21/2165 |
| | | | | 280/730.2 |
| 9,248,800 | B1 * | 2/2016 | Moore | B60R 21/213 |

FOREIGN PATENT DOCUMENTS

| | | | |
|---|---|---|---|
| JP | 2008230473 | A * | 10/2008 |
| JP | 2008230474 | A * | 10/2008 |
| JP | 2009-208558 | A | 9/2009 |

* cited by examiner

SUPPORT MECHANISM FOR CURTAIN SHIELD AIRBAG

CROSS-REFERENCE TO RELATED APPLICATION

This application claims priority to Japanese Patent Application No. 2023-211872 filed on Dec. 15, 2023, incorporated herein by reference in its entirety.

BACKGROUND

1. Technical Field

In the present specification, a support mechanism for a curtain shield airbag is disclosed.

2. Description of Related Art

A curtain shield airbag is disclosed, for example, in Japanese Unexamined Patent Application Publication No. 2009-208558 (JP 2009-208558 A). The curtain shield airbag is deployed downward, from an outer side end portion of a roof in a vehicle width direction. The curtain shield airbag is deployed in a vehicle cabin such that the curtain shield airbag blocks a door glass.

The curtain shield airbag is disposed on a back side of a roof lining. The roof lining is a roof panel of the vehicle cabin. In more detail, the curtain shield airbag is disposed on an outer side end portion in the vehicle width direction on a back side of the roof lining.

SUMMARY

Incidentally, in a so-called sports car, the aerodynamic performance is regarded as important. Accordingly, the roof of the vehicle cabin is set to be low and narrow. Moreover, since a hold performance of an occupant is regarded as important, a large seat is used. As a result, the distance between the seat and the roof lining becomes close.

The curtain shield airbag is deployed in the vehicle cabin, by pressing down the roof lining, from a back surface of the roof lining. Here, when the roof lining and the seat are in close proximity, the roof lining pressed down by the curtain shield airbag hits the seat. As a result, there is a risk of a deployment route of the curtain shield airbag becoming narrow.

The present specification discloses a support mechanism of a curtain shield airbag. According to the support mechanism, a curtain shield airbag can be deployed smoother than a conventional curtain shield airbag, around a seat.

The present specification discloses a support mechanism for a curtain shield airbag.

The curtain shield airbag is disposed in a storage space between a roof side panel and a roof lining.
  The support mechanism includes a case and a pillar garnish.
  The case supports the curtain shield airbag.
  The pillar garnish covers a pillar. The pillar is disposed on an outer side with respect to a seat in a vehicle width direction. An upper end of the pillar garnish is connected to the roof lining.
  A support surface for the curtain shield airbag is provided on an inner side of the case in the vehicle width direction.
  The case extends in an up-down direction.
  A flange is provided on a lower portion of the case. The flange is connected to the pillar garnish.
  A fragile portion of the pillar garnish is provided on a lower side with respect to a connection point with the flange.

According to the configuration, the case is disposed on an outer side in the vehicle width direction with respect to the curtain shield airbag. Accordingly, the case is pressed outward in the vehicle width direction at the time of deployment of the airbag. In addition, the pillar garnish connected to the case is also pressed outward in the vehicle width direction. At this time, an upper portion with respect to the fragile portion is folded and deformed outward in the vehicle width direction. According to the folding and deformation, the deployment route of the curtain shield airbag is expanded.

Moreover, in the configuration,
  a thin portion may be provided on the pillar garnish as the fragile portion.
  In this case, a plurality of the thin portions is provided on the pillar garnish such that the thin portions are spaced apart in a vehicle front-rear direction.

According to the configuration, breaking of the upper portion with respect to the fragile portion is suppressed, compared to a form in which the fragile portion is provided across the entire length of the pillar garnish.

Moreover, in the configuration,
  a reinforcing rib may be provided on the pillar garnish.
  In this case, the rib is provided on a lower side with respect to the fragile portion.

According to the configuration, strength improvement by the rib and folding and deformation at the time of deployment of the curtain shield airbag can be compatible.

Moreover, in the configuration,
  the pillar garnish may include a base material and a surface material.
  In this case, the fragile portion is provided on the base material.
  The surface material covers a surface of the base material that faces a vehicle cabin.
  The surface material further includes an extension portion. The extension portion is folded at an upper end of the base material. In addition, the extension portion covers a back surface of the base material opposite the surface.

According to the configuration, the surface and the back surface of the base material are covered by the surface material at an upper end portion of the pillar garnish. At the time of folding and deforming, even in the unlikely event of the upper end portion of the base material breaking, the upper end portion is caught by the surface material. Therefore, falling of the upper end portion into the vehicle cabin is suppressed.

Moreover, in the configuration, on the back surface of the base material, the fragile portion may be provided on a lower side with respect to the extension portion of the surface material.

According to the configuration, hindering of folding and deformation with the fragile portion as a starting point by the surface material is suppressed.

According to the support mechanism for a curtain shield airbag disclosed in the present specification, a curtain shield airbag can be deployed smoother than a conventional curtain shield airbag, around a seat.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a support mechanism of the curtain shield airbag according to the present embodiment will be described with reference to the drawings. The shapes, materials, numbers, and numerical values described below are illustrative examples. These shapes and the like can be appropriately changed according to the specifications of the support mechanism of the curtain shield airbag. In the following, like elements are given the same reference signs in all drawings.

In FIG. 1 to FIG. 5, the front-rear direction of the vehicle is indicated by a FR shaft. The vehicle-width direction is indicated by RW shaft. Further, the height of the vehicle is indicated by UP shaft. FR shaft, RW shaft, and UP shaft are perpendicular to each other. The front of FR shaft is the positive. The right-hand side of RW axis is the positive direction. UP shaft shall be in the upward direction.

1. Vehicle Cabin Structure

Figure 1:
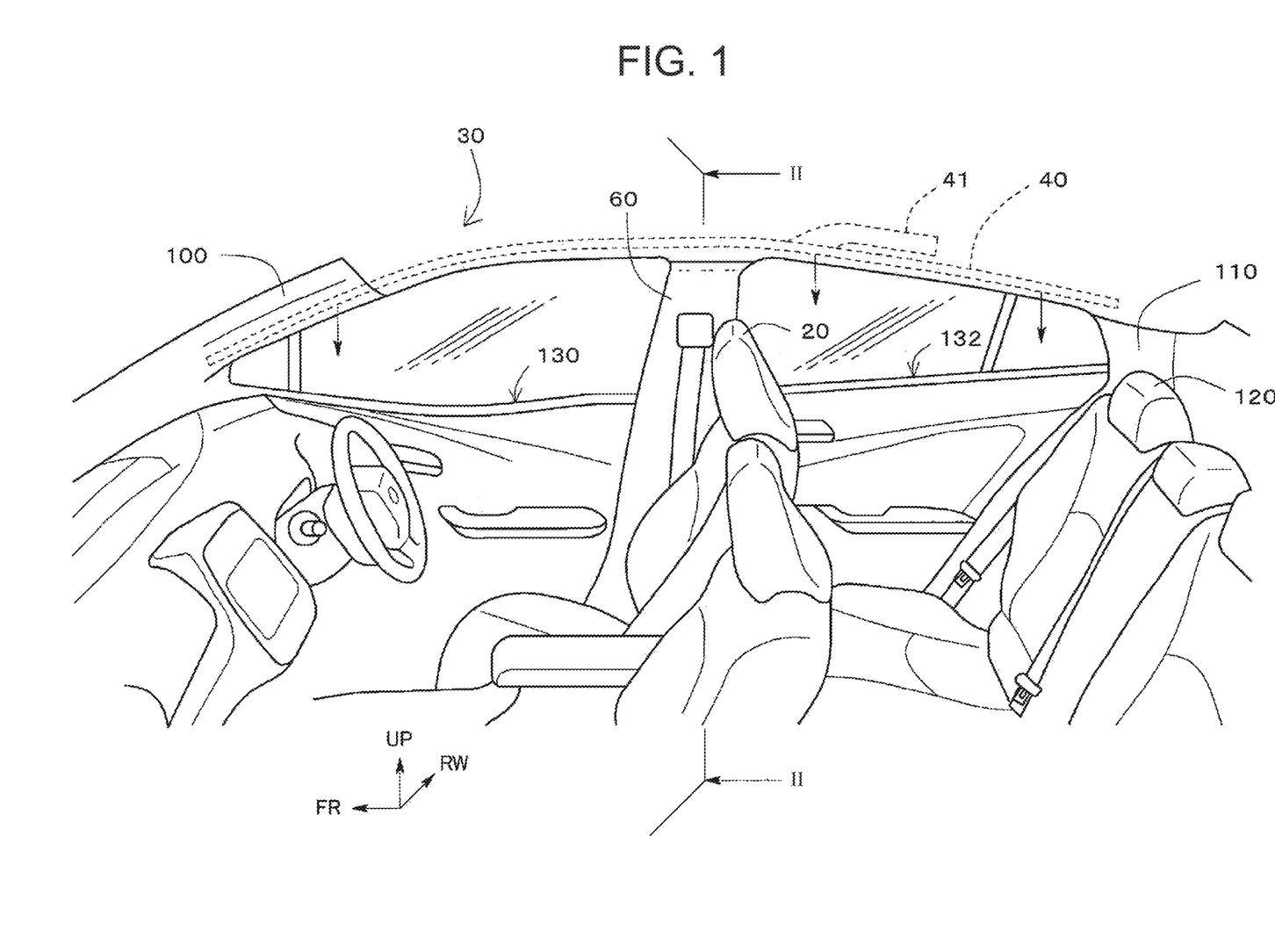
FIG. 1 is a view illustrating inside a vehicle cabin in which a curtain shield airbag device according to the present embodiment is mounted.

FIG. 1 illustrates a vehicle cabin structure. A roof lining 30 is disposed on the ceiling of the vehicle cabin. The roof lining 30 is an interior component and is also referred to as a roof headlining. The roof lining 30 extends along the entire width in the vehicle width direction at the ceiling of the vehicle cabin.

Figure 2:
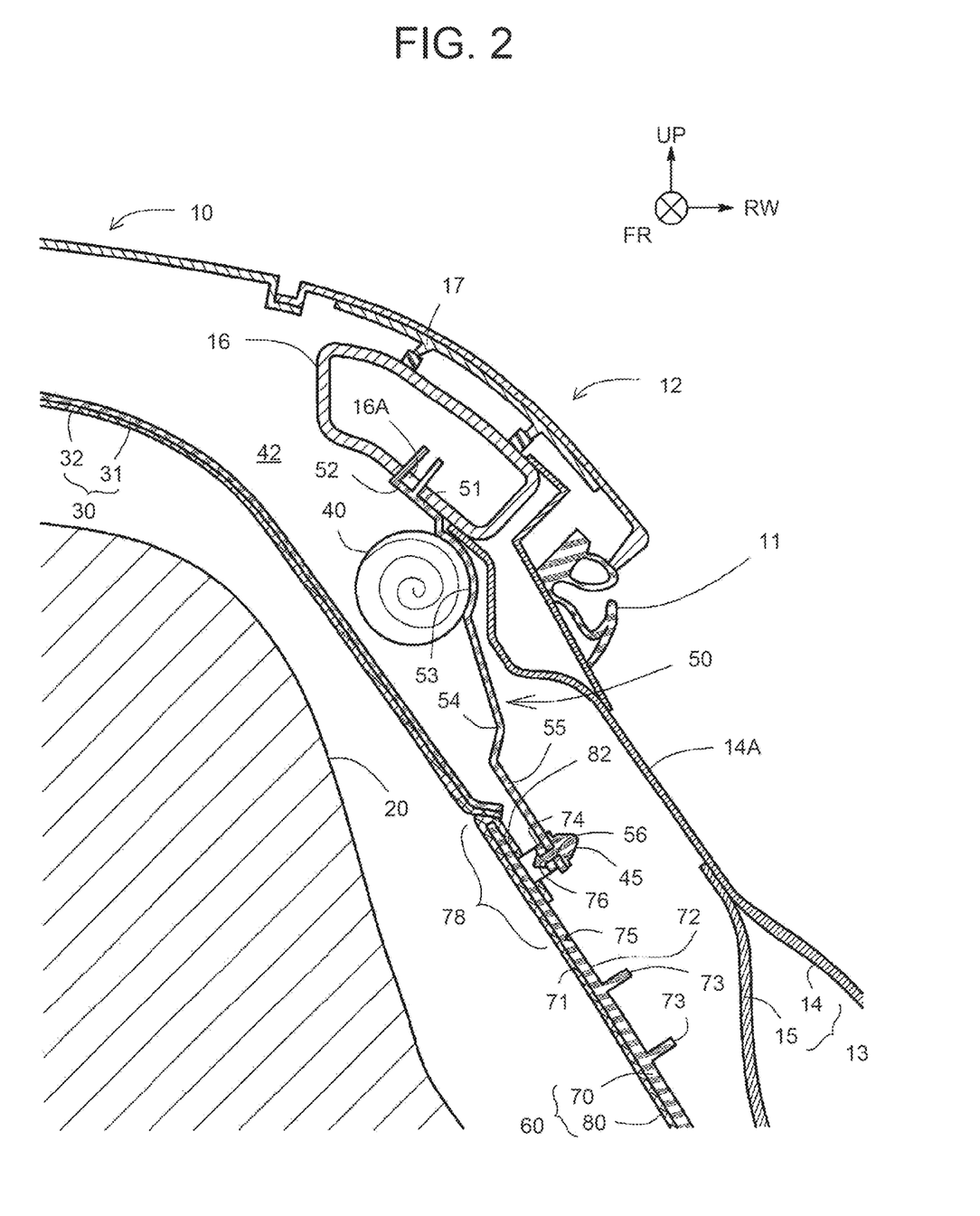
FIG. 2 is a diagram illustrating II-II cross section of FIG. 1.

As illustrated in FIG. 2, the roof lining 30 is a laminate including a base material 31 and a surface material 32. The base material 31 is a board component having a predetermined hardness. The surface material 32 covers the surface of the base material 31. The surface is a surface on the vehicle cabin side.

The vehicle illustrated in FIG. 1 is a so-called sedan type vehicle. That is, the front seat 20 and the rear seat 120 are disposed in the vehicle cabin. A B pillar 13 (see FIG. 2) is disposed on the vehicle width direction outer side of the front seat 20. The B pillar 13 is a skeletal component and extends in the up-down direction. As illustrated in FIG. 2, the upper portion of the B pillar 13 is inclined inward in the vehicle width direction.

Figure 3:
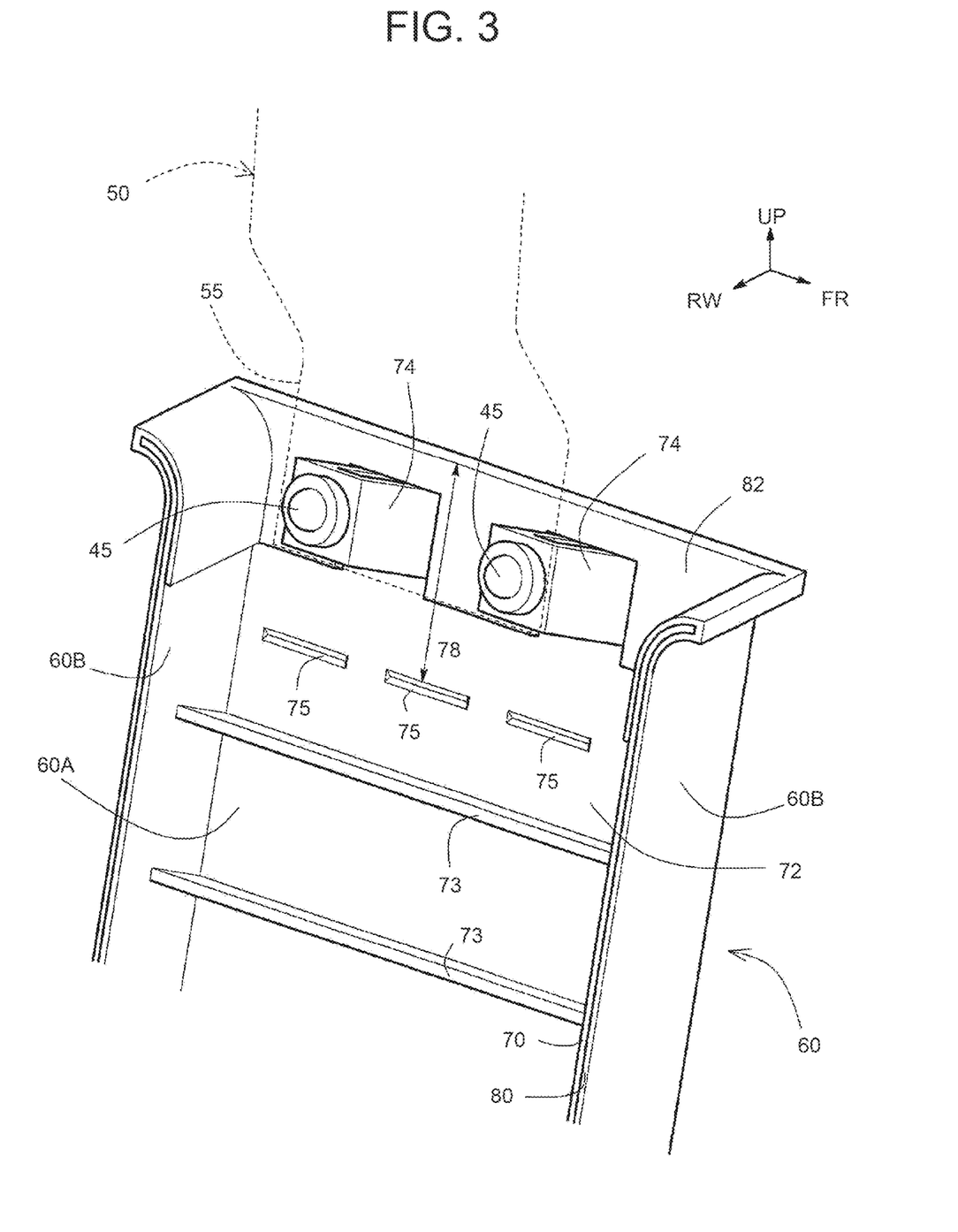
FIG. 3 is a perspective view illustrating the structure of the back surface of the pillar garnish.

The B pillar garnish 60 is an interior component that covers the B pillar 13. As illustrated in FIG. 3, the B pillar garnish 60 has a U-shaped cross section. The B pillar garnish 60 covers the B pillar 13. The detailed structure of the B pillar garnish 60 will be described later.

Referring to FIG. 1, a C pillar (not shown) is disposed on the vehicle width direction outer side of the rear seat 120. Similar to the B pillar 13, the C pillar is covered with the C pillar garnish 110. Further, an A pillar (not shown) is disposed in front of the vehicle cabin. The A pillar is covered with an A pillar garnish 100.

A curtain shield airbag 40 extends from the A pillar to the C pillar. The curtain shield airbag 40 is accommodated in an storage space 42 (see FIG. 2) provided on the rear side of the roof lining 30. The rear side of the roof lining 30 refers to a region opposite to the vehicle cabin side.

Figure 4:
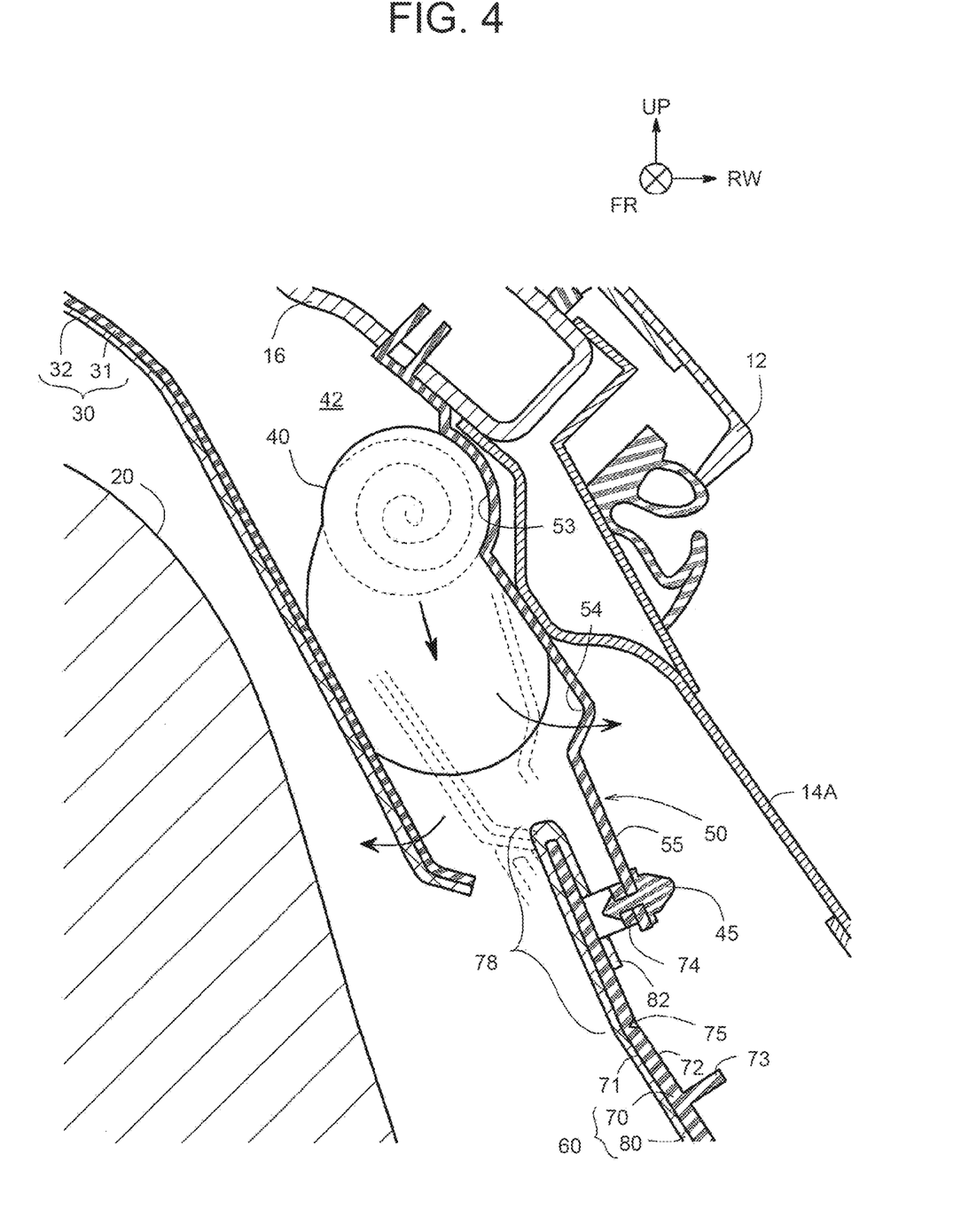
FIG. 4 is a diagram illustrating a deployment process (1/2) of a curtain shield airbag.

As will be described later, the curtain shield airbag 40 is deployed into the vehicle cabin by pushing the end portion of the roof lining 30 in the vehicle width direction during deployment. In the periphery of the front seat 20, as illustrated in FIG. 4, the upper end portion 78 of the B pillar garnish 60 is bent and deformed outward in the vehicle width direction. As a result, the width W2 (see FIG. 5) is secured in the deployment path of the curtain shield airbag 40. Details of the deployment process of the curtain shield airbag 40 will be described later.

2. Peripheral Structure of Curtain Shield Airbag

FIG. 2 to FIG. 5 illustrate II-II cross section of FIG. 1. Note that the front door 130 is not illustrated in these drawings. Further, in these figures, the peripheral structures of the front seat 20 and the B pillar garnish 60 are exemplified. However, the support structure of the curtain shield airbag 40 according to the present embodiment can also be applied to the peripheral structure of the rear seat 120 and the C pillar garnish 110.

Referring to FIG. 2, the curtain shield airbag 40 is accommodated in the storage space 42 in a wound state. An inflator 41 (see FIG. 1) is also provided in the storage space 42. At the time of a side collision of the vehicle, gas is fed from the inflator 41 into the curtain shield airbag 40. As a result, the curtain shield airbag 40 is inflated from the wound state. In the course of this inflation, the curtain shield airbag 40 is deployed downward. The deployed curtain shield airbag 40 covers the front door 130 and the rear door 132 like a curtain.

The curtain shield airbag 40 is supported in the storage space 42 by a support mechanism. As will be described later, the support mechanism includes a roof rail 16, a case 50, and a B pillar garnish 60.

In FIG. 2, a roof panel 10 and a roof side panel 12 are illustrated as the outer panel of the vehicle. As illustrated in FIG. 2, the roof panel 10 extends in the vehicle width direction. A roof side panel 12 is connected to a vehicle width direction outer side end portion of the roof panel 10. The roof side panel 12 is a component having an arc-shaped cross section. The roof side panel 12 extends from the vehicle upper surface toward the vehicle side surface. Further, the lower end of the roof side panel 12 abuts against the weather strip 11.

For example, the roof side panel 12 is supported by the roof rail 16 via the bracket 17. The roof rail 16 is a skeleton component that supports the ceiling of the vehicle.

The roof rail 16 has, for example, a closed cross-sectional structure. The roof rail 16 is disposed above the front door 130 (see FIG. 1) and the rear door 132. The roof rail 16 extends from an A pillar (not shown) to a C pillar.

The upper end of the B pillar 13 is connected to the roof rail 16. For example, the B pillar 13 includes a B pillar outer 14 and a B pillar inner 15. A flange 14A extends from the B pillar outer 14. The upper end of the flange 14A is joined to the roof rail 16. As illustrated in FIG. 2, the upper end portion of the B pillar 13 is inclined inward in the vehicle width direction.

A storage space 42 is formed between the roof side panel 12 and the roof lining 30. A curtain shield airbag 40, a wiring, and the like are accommodated in the storage space 42. For example, referring to FIG. 2, the vehicle width direction inner side of the storage space 42 is partitioned by the roof lining 30 and the B pillar garnish 60. The vehicle width direction outer side of the storage space 42 is partitioned by the roof panel 10, the roof side panel 12, and the B pillar 13.

The case 50 supports the curtain shield airbag 40. For example, the case 50 is made of a resin material having a predetermined hardness, such as a plastic board. Referring to FIG. 2, the case 50 extends in the up-down direction.

A flange 51 is formed at an upper end of the case 50. A clip 52 is formed on the flange 51. In FIG. 2, the case 50 and the clip 52 are integrally formed. Instead of this structure, the case 50 and the clip 52 may be separate parts. The clip 52 is inserted into the fastening hole 16A of the roof rail 16.

A support surface 53 is formed in an intermediate region in the up-down direction of the case 50. The support surface 53 supports the curtain shield airbag 40. For example, the curtain shield airbag 40 is adhered to the support surface 53. The support surface 53 is provided on an inner surface of the case 50 in the vehicle width direction. For example, the case 50 is disposed entirely on the curtain shield airbag in the vehicle width direction outer side.

The case 50 further comprises a flange 55 in the lower part. A fastening hole 56 is bored in the flange 55. The flange 55 is seated on the seating portion 74 of the B pillar garnish 60. The fastening hole 56 of the flange 55 is axially aligned with the fastening hole 76 of the seating portion 74. Further, the clip 45 is inserted into the fastening holes 56 and 76.

It is conceivable to fasten the upper and lower ends of the case 50 to the skeletal component so as to be able to withstand an impact when the curtain shield airbag 40 is deployed. However, in the support mechanism of the curtain shield airbag 40 according to the present embodiment, the lower end is fastened to the B pillar garnish 60 which is an interior component. As will be described later, the B pillar garnish 60 is pushed in the vehicle width direction outer side by using an impact when the curtain shield airbag 40 is deployed. Consequently, the deployment path of the curtain shield airbag 40 is expanded, as shown in the width W2 of FIG. 5.

A bent portion 54 is formed between the flange 55 and the support surface 53. The bent portion 54 changes the extending direction of the case 50. For example, the distance between the roof lining 30 and the B pillar garnish 60 is narrowed below the bent portion 54. In other words, in the lower portion of the case 50, the storage space 42 is narrowed.

Referring to FIG. 2, the upper end of the B pillar garnish 60 connects to and abuts the lower end of the roof lining 30. For example, the surface material 32 of the roof lining 30 and the surface material 80 of the B pillar garnish 60 come into contact with each other.

FIG. 3 illustrates a perspective view of an upper portion of the B pillar garnish 60. The B pillar garnish 60 has a U-shaped cross section and includes a front wall 60A and a pair of side wall 60B, 60B. The B pillar garnish 60 is a laminate including a base material 70 and a surface material 80. The base material 70 is a board component having a predetermined hardness. For example, the base material 70 is formed of a resin material. The surface material 80 is adhered to the base material 70 by an adhesive or the like. The surface material 80 is, for example, an elastic resin component.

The surface 71 (see FIG. 2) of the base material 70 faces the vehicle cabin. The surface material 80 covers the surface 71. Further, the surface material 80 includes an extension portion 82. The extension portion 82 is folded back at the upper end of the base material 70. Further, the extension portion 82 covers the back surface 72 of the base material 70. The back surface 72 is an opposing surface of the front surface 71. Referring to FIG. 3, for example, the extension portion 82 is formed with a notch corresponding to the seating portion 74. That is, the extension portion 82 is adhered to the back surface 72 so as to avoid the seating portion 74.

Various functional units are provided on the back surface 72 of the base material 70. For example, a rib 73, a seating portion 74, and a thin portion 75 (fragile portion) are formed on the back surface 72.

The ribs 73 reinforce the strength of the B pillar garnish. For example, the rib 73 extends substantially perpendicularly to the back surface 72. Further, a plurality of ribs 73 are formed. Note that all the ribs 73 are formed below the thin portion 75. With such a structure, the upper end portion 78 is smoothly bent and deformed from the thin portion 75.

As described above, the flange 55 of the case 50 is seated on the seating portion 74. That is, the seating portion 74 is a connection point between the flange 55 and the B pillar garnish 60. For example, a plurality of seating portions 74 are provided in the vehicle front-rear direction.

A thin portion 75 is formed on the back surface 72 below the seating portion 74. Further, a thin portion 75 is formed below the extension portion 82 of the surface material 80. The base material 70 is thinner in the thin portion 75 than in the peripheral region. That is, the thin portion 75 is a fragile portion. For example, the thin portion 75 is a groove having a V-shaped cross section. In addition, the upper portion of the B pillar garnish 60 from the thin portion 75 is shown as the upper end portion 78 below as appropriate.

The thin portion 75 extends in the front wall 60A in the front-rear direction. Further, a plurality of thin portions 75 are formed on the back surface 72 at intervals in the vehicle front-rear direction. For example, in the front wall 60A, breakage of the upper part from the thin portion 75 is suppressed as compared with the case where the thin portion 75 is formed over the entire length in the front-rear direction of the vehicle. Further, the thin portion 75 is formed only on the front wall 60A, for example, and is not formed on the side wall 60B.

3. Curtain Shield Airbag Deployment Process

At the time of a side collision of the vehicle, a sensor (not shown) of the vehicle detects a side collision load. Then, a deployment command is transmitted from an electronic control unit (ECU, not shown) of the vehicle to the inflator 41 (see FIG. 1). When the expansion command is received, the explosive in the inflator 41 ignites, and nitrogen gas is generated. The nitrogen gas enters the curtain shield airbag 40. As a result, the curtain shield airbag 40 in the stored state (that is, the wound state) expands and expands in a hanging curtain shape.

As illustrated in FIG. 2, a connection point between the roof lining 30 and the B pillar garnish 60 is disposed below the curtain shield airbag 40. The curtain shield airbag 40 is deployed into the vehicle cabin from this connection point.

When the curtain shield airbag 40 is deployed downward, the roof lining 30 serves as a barrier disposed on the inner side in the vehicle width direction. In addition, the case 50 serves as a barrier disposed on the vehicle width direction outer side. As shown, the width of these barriers narrows down. The curtain shield airbag 40 pushes out these barriers during deployment.

As illustrated in FIG. 4, the curtain shield airbag 40 pushes the roof lining 30 inward in the vehicle width direction. Further, the curtain shield airbag 40 pushes the case 50 in the vehicle width direction outer side. The lower end of the case 50 is connected to the upper end portion 78 of the B pillar garnish 60. Accordingly, as the case 50 is pushed in the vehicle width direction outer side, the upper end portion 78 is also pushed outward in the vehicle width direction. In the extrusion process, the upper end portion 78 is bent and deformed starting from the thin portion 75 (fragile portion).

Figure 5:
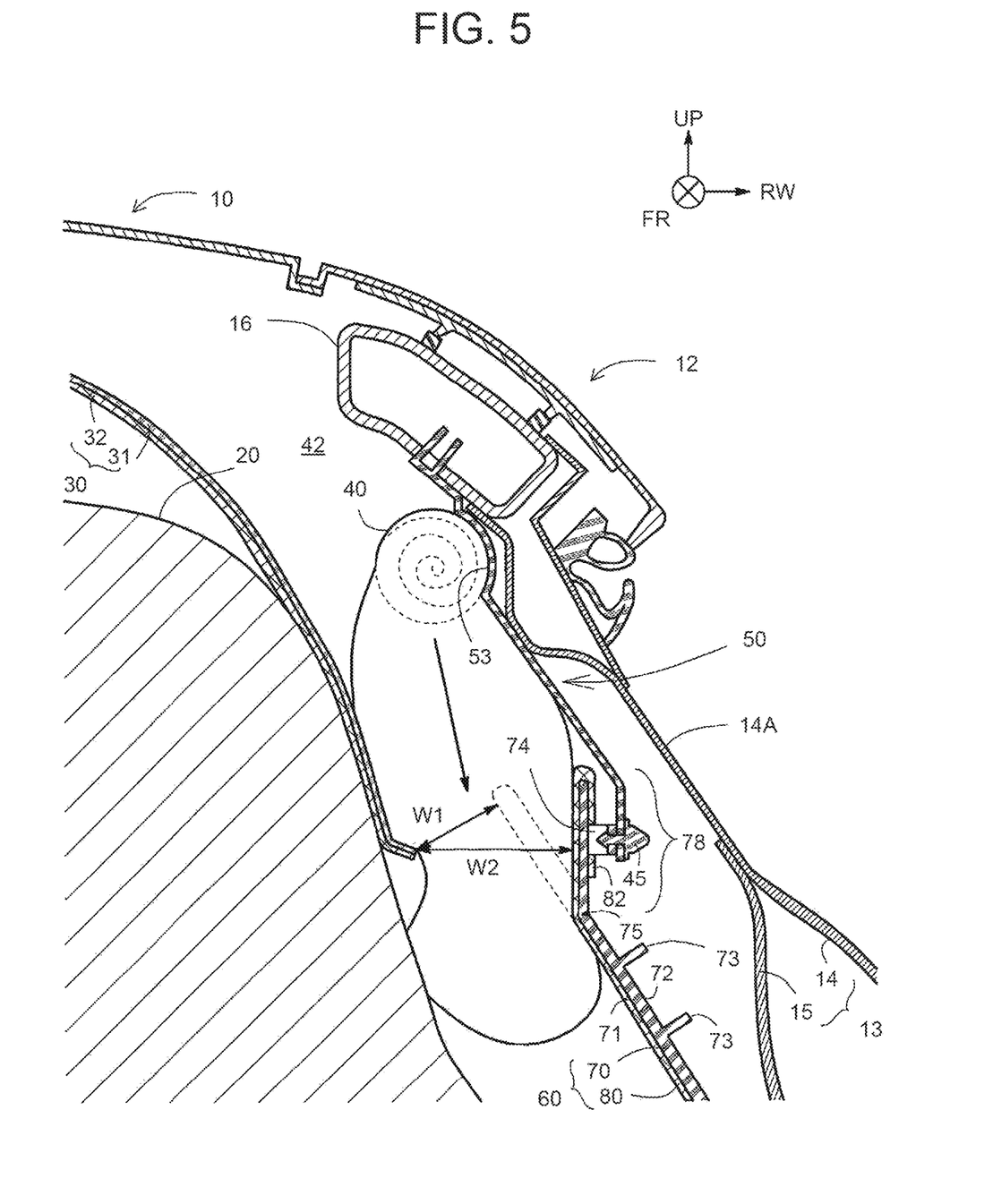
FIG. 5 is a diagram illustrating a deployment process (2/2) of the curtain shield airbag.

As illustrated in FIG. 5, when the distance between the roof lining 30 and the front seat 20 is close, the roof lining 30 hits the front seat 20 when the curtain shield airbag 40 is deployed. That is, the movement of the roof lining 30 inward in the vehicle width direction is stopped by the front seat 20.

On the other hand, the upper end portion 78 of the B pillar garnish 60 is bent in the vehicle width direction outer side. Consequently, the deployment path of the curtain shield airbag 40 is expanded from the width W1 to the width W2. As a result, the curtain shield airbag 40 is smoothly deployed.

Even if the upper end portion 78 is broken, the surface material 80 is adhered to both surfaces of the front surface 71 and the back surface 72. When the surface material 80 catches the broken upper end portion 78, the upper end portion 78 is suppressed from falling into the vehicle cabin.

What is claimed is:

1. A support mechanism for a curtain shield airbag, the curtain shield airbag being disposed in a storage space between a roof side panel and a roof lining, the support mechanism comprising:
    a case that supports the curtain shield airbag; and
    a pillar garnish that covers a pillar disposed on an outer side with respect to a seat in a vehicle width direction, and is connected to the roof lining at an upper end, wherein
    the case has a support surface for the curtain shield airbag on an inner side in the vehicle width direction,
    the case extends in an up-down direction,
    a flange connected to the pillar garnish is provided on a lower portion of the case, and
    a fragile portion of the pillar garnish is provided on a lower side with respect to a connection point with the flange.

2. The support mechanism according to claim 1, wherein:
    a thin portion is provided on the pillar garnish as the fragile portion; and
    a plurality of the thin portions is provided on the pillar garnish such that the thin portions are spaced apart in a vehicle front-rear direction.

3. The support mechanism according to claim 1, wherein:
    a reinforcing rib is provided on the pillar garnish; and
    the rib is provided on a lower side with respect to the fragile portion.

4. The support mechanism according to claim 1, wherein:
    the pillar garnish includes a base material and a surface material;
    the fragile portion is provided on the base material;
    the surface material covers a surface of the base material that faces a vehicle cabin; and
    the surface material further includes an extension portion folded at an upper end of the base material, the extension portion covering a back surface of the base material opposite the surface.

5. The support mechanism according to claim 4, wherein, on the back surface of the base material, the fragile portion is provided on a lower side with respect to the extension portion of the surface material.

* * * * *